United States Patent [19]

Underwood et al.

[11] 3,879,276

[45] Apr. 22, 1975

[54] ELECTROPHORETIC DEPOSITION OF SELENIUM

[75] Inventors: John D. Underwood, Bishop Stortford; Philip F. E. Dutton, Harlow, both of England

[73] Assignee: International Standard Electric Corporation, New York, N.Y.

[22] Filed: Apr. 10, 1974

[21] Appl. No.: 439,814

[52] U.S. Cl. ................................................ 204/181
[51] Int. Cl. .............................................. B01k 5/02
[58] Field of Search .................................... 204/181

[56] References Cited
UNITED STATES PATENTS
2,576,129 11/1951 Levin ................................. 204/181
3,783,025 1/1974 King et al. ......................... 204/181

OTHER PUBLICATIONS

Chemical Abstracts, Vol. 32 (1938) page 6955

*Primary Examiner*—Howard S. Williams
*Attorney, Agent, or Firm*—John T. O'Halloran; Menotti J. Lombardi, Jr.; Vincent Ingrassia

[57] ABSTRACT

Electrophoretic deposition of selenium is achieved by preparing a SOL from selenium dioxide solution and benzaldehyde and then diluting with a solvent.

11 Claims, No Drawings

ELECTROPHORETIC DEPOSITION OF SELENIUM

BACKGROUND OF THE INVENTION

This invention relates to the electrophoretic deposition of selenium.

The known methods of electroplating involve ions which possess a charge. This results in a rate of deposition which is lower than desirable.

SUMMARY OF THE INVENTION

It is an object of the present invention to provide a method of depositing selenium from a colloidal solution at a high deposition rate.

According to a broad aspect of the invention, there is provided a method of electrophoretically depositing a colloidal material, which material has a soluble oxidized form comprising the steps of forming an acid solution of said oxidized form, adding a reducing agent having a low reduction potential in acid solution, and applying an electric field via electrodes to said solution, wherein application of the electric field causes an increase in pH resulting in a reduction of said colloidal material which material migrates to a cathode.

According to a further object of the invention, there is provided a method of electrophoretically depositing selenium comprising the steps of adding an aromatic reducing agent to a concentrated aqueous solution of selenium dioxide, diluting said solution with a solvent other than water, adding a trace of selenic acid, and applying an electric potential between electrodes immersed in the diluted solution to deposit selenium at a cathode.

The above and other objects of the present invention will be more clearly understood from the following detailed description.

DESCRIPTION OF THE PREFFERRED EMBODIMENT

Electrophoresis differs from the more commonly encountered electroplating in that charged particles are involved and not, as in the case of electroplating, ions which possess a charge. The charged particles are extremely fine, and the suspension or collodial solution is commonly known as a sol. The charge on the particle results from the adsorption of ions on the surface. These charges result in the formation of a double layer which, it is thought, gives the sol a degree of stability. In the case of the electrophoretic deposition of selenium described herein the applied electric field has the additional effect of increasing the pH around the cathode thus enhancing reduction of selenium dioxide to colloidal selenium which is then deposited. In other words, the electrophoretic deposition processes described as part physical and part chemical.

The velocity L of a charged particle in an electric field is generally understood to be given by the equation $$L = zDE/4\pi\lambda$$

where E is the electric potential gradient
z is the zeta potential
D is the dielectric constant of the solvent and
λ is the solvent viscosity.

In general, electrophoresis requires higher voltages and lower currents than electroplating and since particles and not ions are involved, the rate of deposition is much faster. The weight per coulomb is much higher than the theoretical amount for electroplating.

In one example of the invention 1 mole of selenium dioxide is dissolved in a minimum of warm water to form selenous acid ($H_2SeO_3$) and 2 moles of benzaldehyde are mixed with the solution. The mix is then absorbed into 1 mole of methanol or other suitable high dielectric constant solvent such as amyl alcohol, or mixtures thereof. The resulting clear yellow solution can be diluted with more methanol or other alcohols such as glycerol or ethylene glycol. It is essential that a trace of selenic acid ($H_2SeO_4$) be added to the solution, in particular to increase the electrical conductivity.

Some other reducing agents can be used in place of benzaldehyde and those tried include acetone, sodium hypophosphite and glucose. These sols are not as stable as those made with benzaldehyde and selenium coagulates within a few hours. However, cinamaldehyde and anisaldehyde have been found almost as good as benzaldehyde. The reason for this is not fully understood but it is believed that the presence of an aromatic acid, such as benzoic acid, plays some part in producing the charge on the sol particles.

The addition of benzaldehyde to the selenium dioxide solution has little immediate effect as the reduction potential of benzaldehyde is low in acid conditions (the pH of a concentrated selenium dioxide solution is less than 2.0).

When a current is passed through the solution the electrode potential around the cathode rises causing local reduction of selenium dioxide to colloidal selenium. The selenium particles thus formed then migrate in the electric field to be deposited on the cathode.

If deposition is carried out slowly, e.g. over a period of 1 hour, in a bath at room temperature a deposit of red amorphous selenium is formed, but if the bath temperature is raised to about 110°C (a solvent of boiling point higher than 110° must be employed in this application) grey metallic selenium is deposited. The coating is fine and hard, considerable mechanical effort being required to remove it from the plate.

In a second example 0.5 mole of selenous acid ($H_2SeO_3$) is diluted with methanol to 500 mls, and 0.25 mole of benzaldehyde is added together with a trace of selenic acid. Electrophoretic deposition can be performed directly on this solution, the selenium again being deposited at the cathode.

In a third example 0.5 mole of selenium dioxide is dissolved in methanol and mixed with 5 ml. 100 vol. hydrogen peroxide, and the solution is boiled to enhance production of the essential trace of selenic acid. The solution is diluted with methanol or other suitable solvents, mixed with 0.25 mole benzaldehyde, and electrophoresis may then be carried out as before.

It should be noted that in all these examples the selenium is deposited at the cathode, and not at the anode as is commonly experienced with electrolysis. The electrophoretic deposition of selenium as described has the advantage that photo-resist masking techniques can be utilized to achieve selective deposition of selenium. Deposition may also be performed on uneven surfaces.

This process employing electrolytically induced reduction to form the desired sol in the region of the cathode is not necessarily limited to the deposition of selenium. Thus, other materials, such as tellurium, or cadmium or lead selenide, may also be electrophoretically deposited in this way.

It is to be understood that the foregoing description of specific examples of this invention is made by way of example only and is not to be considered as a limitation on its scope.

We claim:

1. A method of electrophoretically depositing a colloidal material, which material has a soluble oxidized form comprising the steps of:

forming an acid solution of said oxidized form;

adding a reducing agent having a low reduction potential in acid solution; and applying an electric field via electrodes to said solution, wherein application of the electric field causes an increase in pH resulting in a reduction of said colloidal material which material migrates to a cathode.

2. A method of electrophoretically depositing selenium comprising the steps of:

adding an aromatic reducing agent to a concentrated aqueous solution of selenium dioxide;

diluting said solution with a solvent other than water;

adding a trace of selenic acid; and applying an electric potential between electrodes immersed in the diluted solution to deposit selenium at a cathode.

3. A method according to claim 2, wherein said reducing agent is benzaldehyde.

4. A method according to claim 2, wherein said reducing agent is cinamaldehyde.

5. A method according to claim 2, wherein said reducing agent is anisaldehyde.

6. A method according to claim 2, wherein said solvent is methanol.

7. A method according to claim 2, wherein said electrophoretic deposition is performed at a temperature of approximately 110°C.

8. A method of electrophoretically depositing selenium comprising the steps of:

forming a concentrated selenous acid solution coating 1 mole of selenous acid ($H_2SeO_3$);

adding 2 moles of benzaldehyde and 1 mole of solvent having a high dielectric constant;

diluting the solution with further solvent;

adding a trace of selenic acid ($H_2SeO_4$); and applying an electric field to the solution via electrodes to deposit a selenium at a cathode from the solution.

9. A method according to claim 8, wherein said selenous acid solution is prepared by dissolving selenium dioxide in water.

10. A method of electrophoretically depositing selenium comprising the steps of:

diluting 0.5 mole selenous acid ($H_2SeO_3$) with 500 mls methanol;

adding 0.25 mole benzaldehyde and a trace of selenic acid ($H_2SeO_4$); and applying an electric field between electrodes immersed in the solution to deposit selenium therefrom at a cathode.

11. A method of electrophoretically depositing selenium comprising the steps of:

dissolving 0.5 mole selenium dioxide in methanol;

boiling the solution with 5 ml 100 mol hydrogen peroxide;

diluting the solution with methanol;

mixing the diluted solution with 0.25 mole benzaldehyde; and applying an electric field between electrodes immersed in the liquid to deposit selenium therefrom at a cathode.

* * * * *